United States Patent
Saumsiegle et al.

[15] 3,694,124
[45] Sept. 26, 1972

[54] INJECTION BLOW MOLDING EQUIPMENT

[72] Inventors: Robert W. Saumsiegle, Meadow Lane, 28, Needham, Mass. 02192; Bruno J. Segmuller, Stein am Rhine, Switzerland

[73] Assignee: said Saumsiegle, by said Segmuller

[22] Filed: Oct. 16, 1970

[21] Appl. No.: 81,248

[52] U.S. Cl. .................425/242, 425/342, 425/387
[51] Int. Cl. ...........................................B29d 23/03
[58] Field of Search.........18/5 BH, 5 BB, 5 BJ, 5 BP, 18/5 BM; 425/242, 326

[56] References Cited

UNITED STATES PATENTS

| | | |
|---|---|---|
| 2,290,129 | 7/1942 | Moreland et al....18/5 BH UX |
| 3,412,186 | 11/1968 | Piotrowski................18/5 BJ X |
| 3,029,468 | 4/1962 | Valyi..........................18/5 BJ |
| 3,048,889 | 8/1962 | Fischer et al. .............18/5 BB |

FOREIGN PATENTS OR APPLICATIONS

| | | |
|---|---|---|
| 203,385 | 9/1956 | Australia...................18/5 BB |
| 6,703,702 | 9/1967 | Netherlands...............18/5 BJ |

Primary Examiner—H. A. Kilby, Jr.
Attorney—Synnestvedt and Lechner

[57] ABSTRACT

An arrangement of injection blow molding equipment which is in the form of an adapter or tool insertable into and removable from a conventional injection molding machine having a stationary platen with a centrally located plasticizing device and having a reciprocable platen, the tool being adapted to be inserted and removed substantially without modification of the injection molding machine. The equipment includes an annular series of cores mounted upon a turntable which in turn is adapted to be secured to the reciprocable platen of an injection molding machine, and further includes an annular series of molds adapted to be mounted upon the stationary platen, alternate molds in the annular series comprising preform injection molds and blow molds. Mechanism is provided for angularly oscillating the core supporting turntable so as to alternately insert each core into a preform injection mold and a blow mold.

22 Claims, 6 Drawing Figures

PATENTED SEP 26 1972

3,694,124

INVENTORS.
ROBERT W. SAUMSIEGLE
BRUNO J. SEGMULLER
BY
*Synnestvedt & Lechner*
ATTORNEYS.

INVENTORS
ROBERT W. SAUMSIEGLE
BRUNO J. SEGMULLER

ATTORNEYS

INJECTION BLOW MOLDING EQUIPMENT

This invention relates to plastic or resin molding equipment and is particularly concerned with equipment adapted for use in molding hollow formed objects, for example objects having a neck smaller than the major body size, for example containers, especially open mouth or top and closed-bottom containers, such as jars, cups and bottles.

A principal object of the invention is to provide injection blow molding equipment for the above purposes, in which the equipment is arranged or constructed as an adapter or tool which may readily be inserted into and removed from any one of various known or conventional injection molding machines, without appreciably altering the injection molding machine, so that the basic injection molding equipment may alternatively be used either with the adapter or tool of the present invention, or with other injection molding tools.

Although certain injection blow molding arrangements have been devised or proposed for use with injection molding machines, such prior arrangements have all been subject to one or another of several difficulties and disadvantages. In some instances, such prior arrangements can only be used with standard injection molding equipment by making modifications in the equipment, which modifications are of such character that the basic injection molding machine cannot be used with other molding tools without extensive reconstruction work. On the other hand, certain prior proposals for equipment to be used in an injection molding machine were not practical for various reasons including difficulties encountered in efforts to equally and uniformly distribute and deliver the softened plastic into the injection molds, and difficulties encountered in making appropriate arrangements for introduction of blowing air in the blow molds.

In contrast with the foregoing, it is an object of the present invention to provide injection blow molding equipment which is not only readily insertable into and removable from a standard injection machine, but which also provides highly desirable conditions with respect to both injection molding of preform in the injection molds and blowing of the preforms in the blow molds. Thus, the invention provides for injection of the softened plastic into the bottom of the closed-bottom preform mold, preferably the center of the bottom, so that the plastic is uniformly distributed from the point of injection throughout the walls of the preform all the way to the edge of the mold cavity providing the open top or neck of the article being formed. In addition, the invention provides for introduction of the blowing air through the preform core so as to progressively release or free the plastic from the core surface. Preferably the air is introduced adjacent to the neck of the article being formed so as to progressively release or free the plastic from the core in a direction from the neck to the bottom of the article being blown.

In considering another object of the invention, it is noted that in certain prior arrangements of injection blow molding equipment, the preform forming cores and the supporting structure therefor are required to be moved through an angular range of 180° in order to transfer the injection molded preforms into the blow molds. In some prior arrangements the cores are arranged in side-by-side pairs, with the axis of angular motion extended parallel to the axes of the cores, (see for example Figs. 14 to 16 of the Farkas U.S. Reissue Pat. No. RE 26,265), and in other such prior arrangements the axis of angular motion is perpendicular to the axis of the cores, so that the cores are required to move in a flip-flop sense in order to transfer the preforms to the blow molds (see for example FIG. 6 of Piotrowski U.S. Pat. No. 3,339,231). Quite apart from the fact that with large angular movement the arrangement of the infeed and outfeed conduits for heating, cooling and blowing air is extremely difficult since the struts or other supports tend to "get-in-the-way," an angular movement through a range of 180° constitutes much too great an opening time for performing a rational and precision-type production. The plastic material tends to already partially cool during its travel from the injection mold to the blow mold, and a cold flow prevails at the molded object or article during blowing thereof in the blow mold. With such molding tool it is therefore difficult to fabricate glass-clear plastic containers. While it would be possible to at least partially overcome such drawback by providing greater injection temperatures of the plastic material, or additionally heating the core, still, these measures would tend to retard solidification of the molded object to the blow mold. This, in turn, would result in irrational and uneconomical fabrication of the molded objects.

In achieving this objective, the invention contemplates the use of an annular series of cores mounted upon the reciprocable platen of the press, preferably an even number of cores, for example eight cores carried by a turntable which is rotative about an axis paralleling the direction of movement of the reciprocable platen of the injection molding press. In association with this annular series of cores, an annular series of molds is provided, the molds being mounted on the stationary platen of the injection molding machine and the molds including four blow molds, preferably alternately positioned in the mold series.

With the arrangement just described, it is possible to effect transfer of the preforms from the injection molds to the blow molds, and to return the preform cores back to the injection molds by angular oscillation of the cores and the mounting structure therefor through a range of only 45°. This is highly desirable from a number of standpoints including the fact that it is of importance to reduce the time of this transfer and thereby diminish the interval between the injection molding and the blow molding operations. The smaller angular range of motion required is also desirable because flexible connections for heat transfer medium such as oil and for delivery of blowing air through the cores need not be as long and need not be flexed as far as in the case where angular oscillation of 180° is required.

In addition to the forgoing, the invention contemplates numerous structural and operational improvements with respect to individual parts of the equipment, including novel arrangements for affecting cooling of the molds and for effecting separation of various mold parts employed including a neck ring used in the injection molding of the neck portion of the open-top articles adapted to be produced.

How the foregoing and other objects and advantages are attained will appear more fully from the following description referring to the accompanying drawings which illustrate a preferred embodiment of the invention, and in which.

Figure 1:
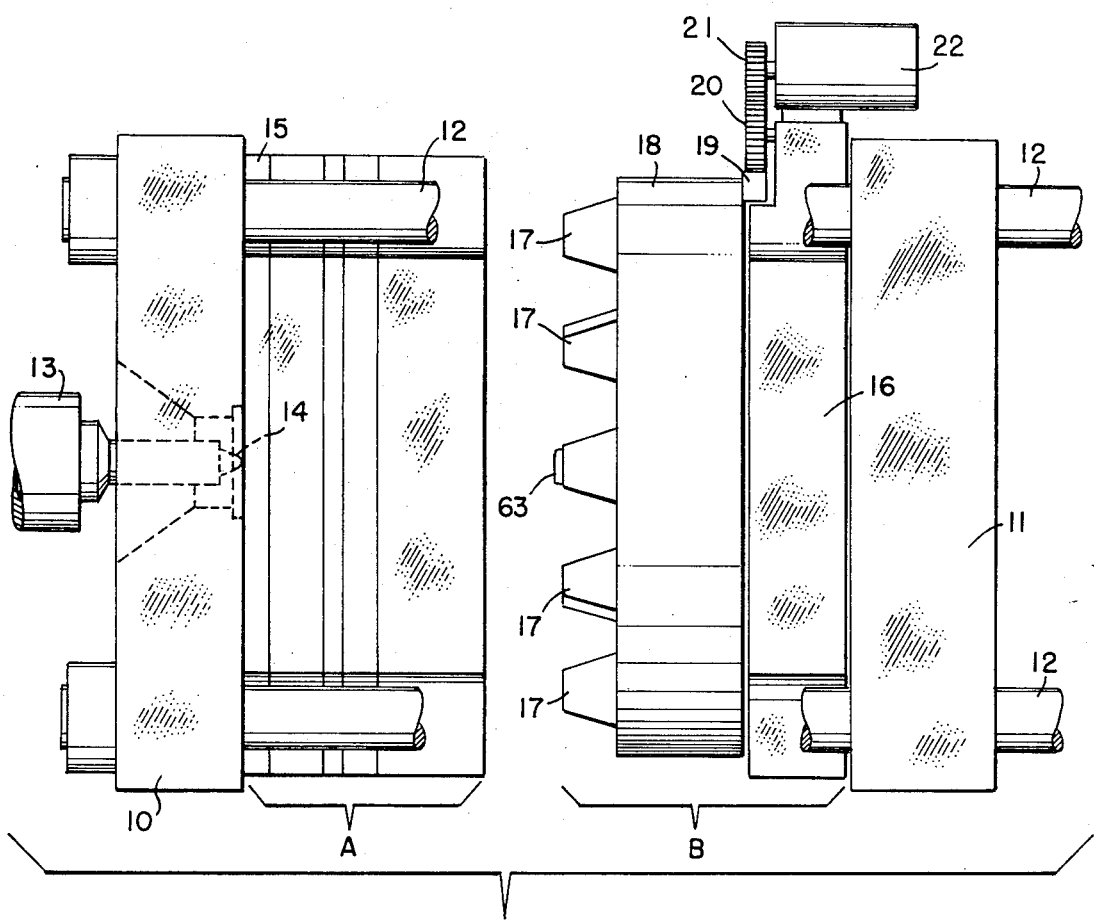
FIG. 1 is an elevational somewhat diagrammatic view of equipment constructed according to the present invention shown as being mounted upon the stationary and reciprocable platens of a conventional injection molding machine, and with the core and mold parts separated.

Reference is first made to the generalized view of FIG. 1. In this figure the stationary platen of a conventional injection molding machine is indicated at 10, and the reciprocable or movable platen is indicated at 11, the platen 11 being mounted by means of tie bars or guides 12 on which the platen 11 may move toward and away from the platen 10.

In a conventional injection molding machine a plasticizing device, for example a screw extruder, is provided for the purpose of softening and feeding the resin or plastic material to be molded. The delivery end of such a device is indicated at 13 in FIG. 1 and the softened resin is adapted to be discharged through a nozzle 14 into certain channels provided in the equipment of the invention, as will be described more fully hereinafter. It is contemplated that the features of the invention may be used with any resin softening or plasticating mechanism or system, a screw extruder merely being a typical example.

The equipment of the present invention comprises two portions, one of which bracketted at A includes an annular series of molds and the other, bracketted at B, an annular series of cores. The mold portion is adapted to be mounted upon a stationary platen 10 by means of a front plate 15, and the core part is adapted to be mounted upon the movable platen 11 by means of the back plate 16. In FIG. 1 the cores are indicated at 17, but the individual molds are not shown. However, all of these parts are described with reference to other figures. Still referring to FIG. 1, it will be seen that the cores are mounted upon a turntable 18 which is adapted to be oscillated by means of an arcuate rack 19, intermediate gear 20 and the driving gear 21 which is mounted on the shaft of a reversible motor 22.

Figure 2:
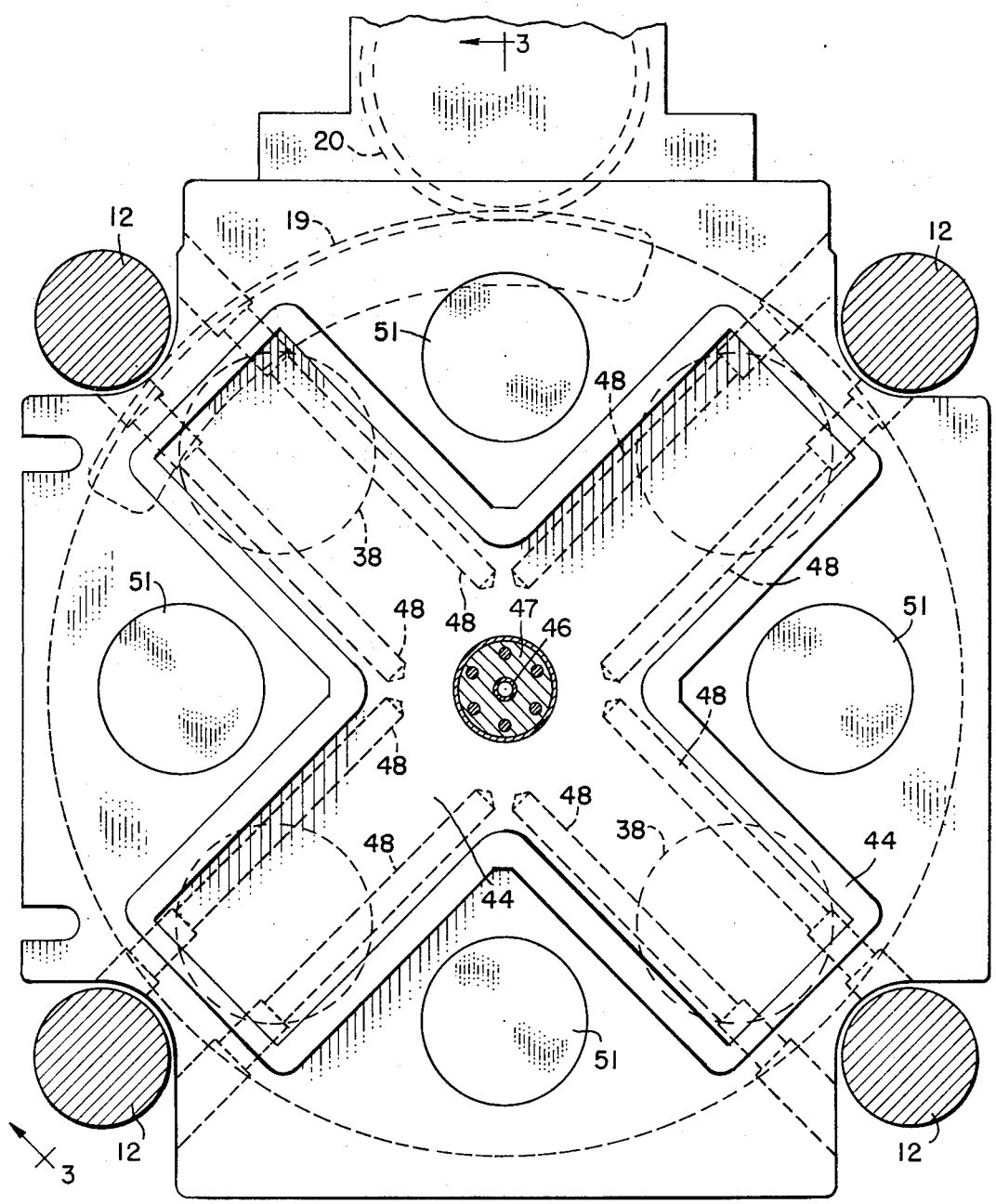
FIG. 2 is a view on a larger scale taken generally as indicated by the section line 2—2 on FIG. 3 and illustrating certain of the parts mounted upon the stationary platen of the injection molding machine.
Figure 3:
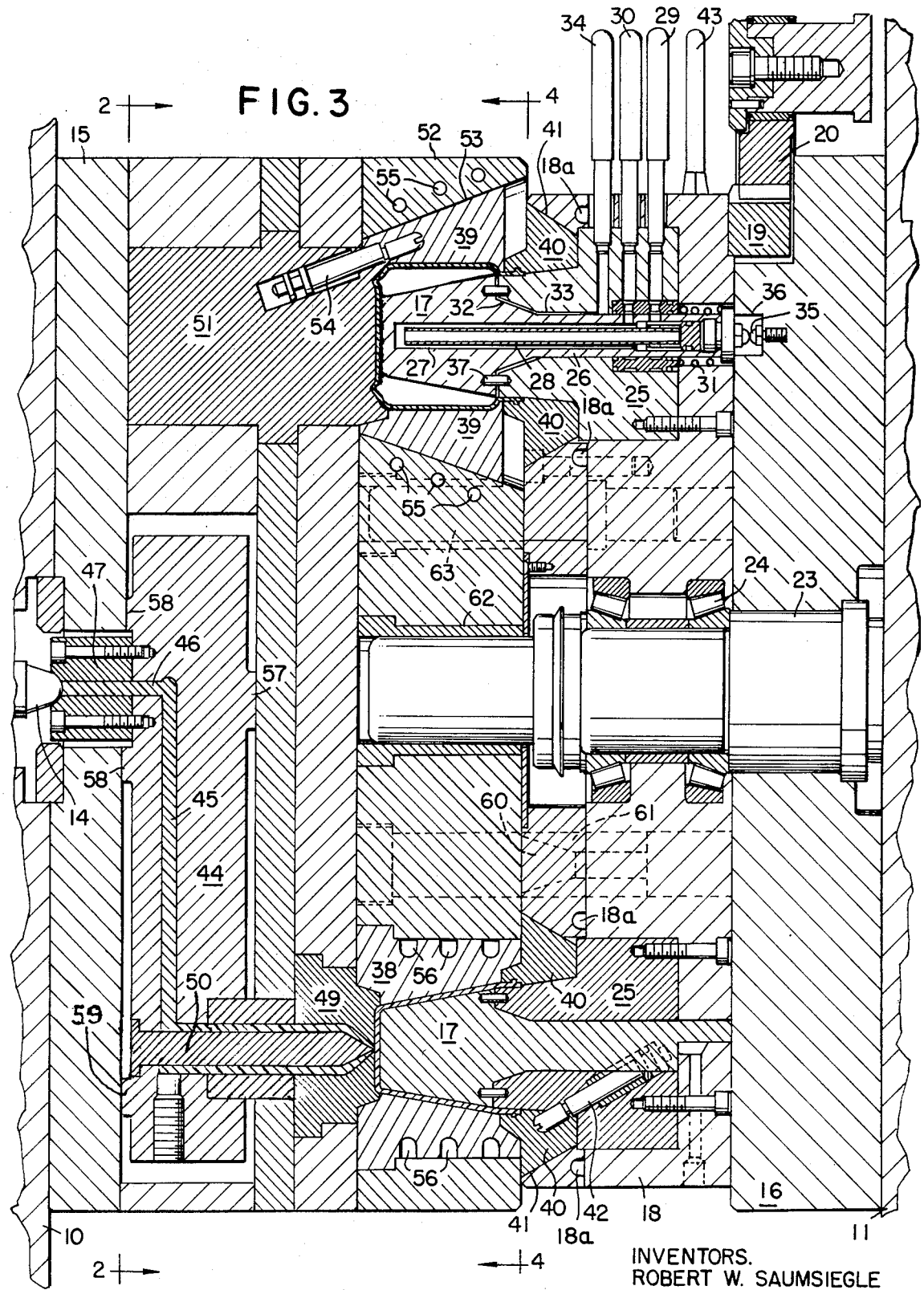
FIG. 3 is a transverse sectional view taken as indicated by the section line 3—3 on FIG. 2, and showing certain of the cores inserted into molds.
Figure 4:
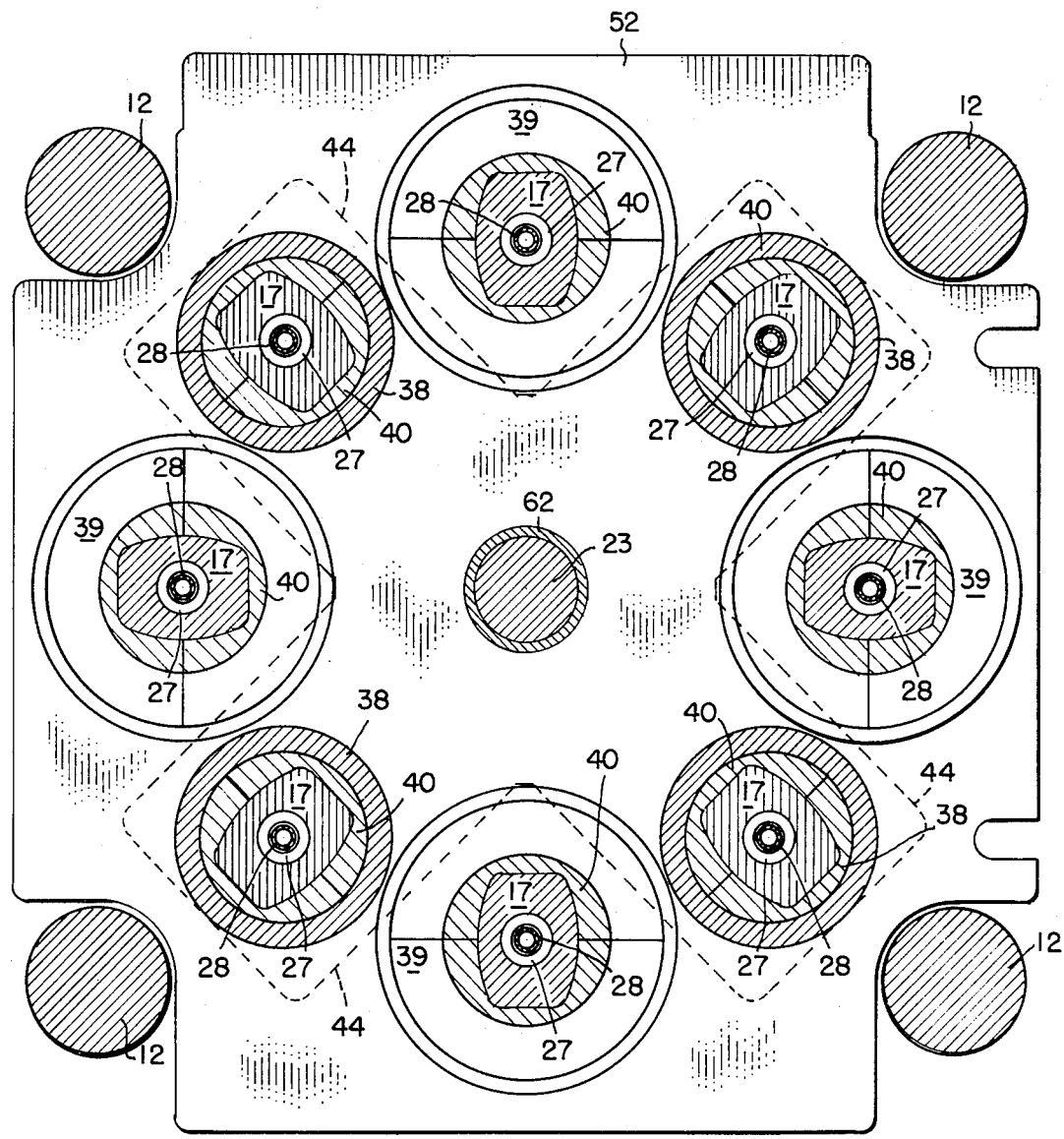
FIG. 4 is a view showing the series of cores, this view being taken generally on the line 4—4 on FIG. 3, which is the parting line between various devices carried on the stationary platen and those carried on the reciprocable platen.

In FIG. 1 the core and mold portions of the equipment are separated, this being effected by withdrawal of the movable platen 11, and in considering the following description of various parts which are described primarily with reference to FIGS. 2, 3 and 4, the following general sequence of steps should be kept in mind.

Thus, the movable platen 11 and the cores will move to the left as viewed in FIG. 1 causing the cores to be inserted into molds mounted on the stationary platen 10 by means of the front plate 15. The annular series of molds alternates between preform injection molds and blow molds, so that alternate cores in the series are received in injection and blow molds. After injection of preforms in the injection molds and blowing of previously formed preforms in the blow molds, the movable platen 11 is withdrawn in order to separate the cores from the molds. While the molds are open the blown articles are separated and discharged, for instance by gravity. The motor 22 is then operated in order to angularly shift the turntable 18 to a position in which a core which had previously been inserted into an injection mold will now be positioned for insertion into a blow mold. The platen 11 then advances again to cause insertion of the cores into the molds. In this way alternate molds are used to form preforms and to blow the previously formed preforms, so that all molds are used on each stroke or reciprocation of the press.

With the foregoing in mind, attention is now directed to various of the devices and structure shown in FIGS. 2, 3 and 4.

The mounting and arrangement of the cores 17 and turntable 18 is first described with particular reference to FIG. 3. A stub axle of shaft 23 is fixed in the back plate 16 and projects therefrom to support the turntable 18, suitable bearings 24 being provided to ensure free oscillation of the turntable with respect to the mounting shaft. Each core 17 is mounted by means of a core base 25 which is fixedly secured within a recess in the outer face of the turntable 18. The core base 25 has a central aperture for receiving the stem 26 of the core 17, which stem extends back through the core base and also into an aperture in the turntable, as clearly appears toward the top of FIG. 3. The core 17 and its stem 26 are provided with a central bore 27 in which a tube 28 is located, the tube being of smaller outside diameter than the bore 27 in order to provide an annular passage surrounding the tube, in addition to the passage within the tube. These passages are provided for circulation of a heat transfer medium, such as oil, which is introduced through the connection 29 into the interior of the tube 28, so that the oil flows within the tube 28 to the left hand end as viewed in FIG. 3 and then flows back through the annular passage surrounding the tube 28, from which it is discharged through the outlet connection 30. It will be understood that the connections 29 and 30 incorporate flexible tubes so that those connections will not interfere with the oscillation of the turntable during operation. The core 17 and the core stem 26 comprise an integral unit and are shiftable in an axial direction with respect to the core base 25. A spring 31 acting against an abutment on the end of the core stem 26 normally urges the core and its stem toward the right as viewed in FIG. 3 so that the inclined surfaces of the core and the core base at 32 seat against each other. A channel 33 is provided in the core base adjacent to the stem 26 in order to provide for flow of blowing air introduced through the connection 34 into the blow mold, when the core 17 and its stem 26 are shifted to the left, thereby unseating the tapered surfaces at 32 in order to provide a continuation of air channel from the channel 33 into the interior of the mold. It will be understood that in the air supply line 34 a controlled and timed valve will be employed in order to introduce the blowing air at the desired point in the cycle of operations.

Movement of the core 17 and its stem 26 to the left so as to open the channel for blowing air is effected by means of a core actuating cam 35 at the base end of the core stem, this cam lying within an arcuate groove 36 formed in the back plate 16, and preferably being adjustable so as to control the extent of opening of the air flow passage for the blowing air. The core 17 and its stem 26 are guided for relative axial shifting movement while preventing relative rotation, by means of pins 37 extended into cavities formed in both the core 17 and the core base 25.

Each of the eight cores in the embodiment illustrated is constructed and mounted in the manner just described, although not all of those parts are also shown in the core which appears toward the bottom of FIG. 3 in which one of the cores 17 is shown in position within a preform injecting mold 38, instead of in the blow mold cavity provided within the mold splits 39-39 shown toward the top of FIG. 3.

A split neck ring 40 is associated with each one of the cores 17, a portion of this ring 40 being positioned to surround the core base 25 and being shaped to cooperate with the core base in order to define a neck ring cavity in which the neck portion of the container being molded is formed by injection molding. The parts of the split neck ring 40 are arranged to be opened by shifting movement along the inclined interengaging surfaces 41 formed on the neck ring parts and on the turntable 18. The opening movement of the neck ring parts is effected by a neck ring piston 42 one end of which is connected with the neck ring and the other end of which is anchored on the turntable 18. The motion of the neck ring parts and the action thereof will be explained more fully hereinafter, following description of additional structural features, particularly those incorporated in the mold portion of the equipment. Operating fluid, such as oil for the neck ring pistons 42 is supplied through a connection 43, which, like the connections 29, 30 and 34, also incorporates a flexible tube for the purpose of accommodating the oscillating motion of the turntable 13.

Turning now to the arrangement of the mold portion of the equipment, it is first pointed out that a cross-shaped structure having four arms 44 is mounted upon the front plate 15 which in turn is carried by the stationary platen of the molding machine. Each of these arms has a plastic flow passage 45 therein communicating at the center with a central passage 46 which extends through a sprue bushing 47 to the nozzle 14 of the plastic extruder of other plasticizing devices employed. Each arm 44 (see FIG. 2) is provided with cartridge type electrical heating elements 48, so that the cross-shaped structure comprises a series of four hot runners for the plastic, each runner being extended for delivery of softened plastic into one of the four injection molds.

At the base of each injection mold 38 a gate pad 49 is provided serving to define a bottom wall for the preform molding cavity, and this gate pad is centrally apertured by a channel extending back to and communicating with the outer end portion of the plastic passage 45 in one of the hot runners 44. The channel between the passage 45 and the base of the injection molding cavity is enlarged and accommodates a torpedo, for instance a copper alloy torpedo 50 for the purpose of improving uniformity of consistency and maintaining the heat of the plastic material being delivered from the hot runner into the injection molding cavity. From the illustration toward the bottom of FIG. 3 it will be seen that the point of injection of plastic into the preform injection mold is at the center of the bottom wall of the preform cavity formed between the core 17 and the mold parts 38 and 49. This provides for uniformity of distribution of the softened plastic being introduced into the preform mold. Further reference to this injection step will be made hereinafter following description of the additional parts which make up the mold portion of the equipment.

As above indicated, in the embodiment here shown, four blow molds are also employed, being alternately positioned in an annular series between the preform injection molds. For each blow mold, there is a blow cavity base 51 which is mounted upon the front plate 15 and which serves to define the bottom wall of a blow mold cavity. The side walls of this cavity are defined by the split mold parts 39 referred to above. A mold mounting structure 52 surrounds the split mold parts 39, and interengaging inclined surfaces 53 are provided between the structure 52 and the split mold parts 39 in order to define a path of motion for the mold parts 39 providing for opening of the mold. This opening action is effected by blow cavity pistons such as indicated at 54 which are desirably hydraulically actuated.

The mold mounting structure 52 advantageously includes channels 55 for the flow of a cooling medium, such as water, in order to carry heat away from the blow mold and thereby accelerate the chilling and hardening of the article being blown.

Similarly, cooling water is adapted to be circulated through cooling channels 56 formed in the injection mold walls 38, although for reasons which will appear more fully hereinafter, it will be understood that the injection mold would not necessarily be cooled to the same extent as in the case of the blow mold cavity.

Still further, cooling water is adapted to be circulated through channels indicated at 18a in the turntable structure adjacent to the guides or shoes cooperating with the neck ring splits 40.

Connections for cooling liquid to be circulated through the channels 55, 56 and 18a are not illustrated and form no part of the present invention per se. It may be noted that these may be arranged in any suitable manner, having in mind that the parts to which the cooling water is being delivered are not movable parts.

From the foregoing it will be seen that the mold portion of the equipment includes certain devices which are being cooled and other devices which are being heated. With this in mind, it is contemplated that the heated portions, especially the hot runners 44, be thermally insulated from the remainder of the mold structure. The hot runners 44 which comprise the metal cross above referred to are spaced from other parts of the structure as by spacer pads 57, 58 and 59 formed on the arms of the cross. Such spacing introduces air insulation between the hot runners and adjoining metal parts, thereby avoiding excessive heat transfer by conduction.

In order to assure proper interfitting of the cores and molds when the two assemblies of the equipment are brought together, tapered male and female interlocking elements 60 and 61 are provided. In addition the central mounting shaft 23 for the turntable 18 enters into a centering sleeve 62 provided in the mold portion of the equipment.

The turntable 18 also desirably carries a leader pin 63 which enters a cavity provided in the mold portion of the equipment, and this leader pin (see particularly FIG. 1) projects slightly beyond the cores 17. This serves as a safety device, preventing motion of the two portions of the equipment together in a position other than that in which the cores will register with molds and thereby prevents damage to the cores.

With regard to the operation of the equipment described above, it is first noted that in the illustrative embodiment shown in FIGS. 1 to 4, a plastic container or jar is being produced, the jar having a somewhat flattened body shape and having an open neck with an outwardly projecting rib for cooperation with a cap or lid.

It will also be understood that the following sequence of operations will of course be controlled by timing mechanism associated with various of the operating parts.

In considering the operation it is to be kept in mind that both injection molding of preforms, and blowing of preforms is occurring simultaneously and that all four injection molds and all four blow molds are in operation at each stroke of the apparatus.

Beginning with a cycle of events as represented by the injection molding condition illustrated toward the bottom of FIG. 3, it is first pointed out that the softened plastic has entered the preform molding cavity at the bottom of FIG. 3 and has been delivered all the way up the side walls of the cavity and into the neck ring cavity lying between the core base 25 and the split neck ring 40. Since each neck ring is in contact with cooled parts including the turntable and the molds, not only during the time the core lies within the injection mold, but also during the time when the core lies within the blow mold, the neck ring will thus be appreciably cooled. This is desirable as it initiates the hardening of the neck, and the presence of a somewhat hardened neck is important in the subsequent steps of the operation.

After the injection molding of the preform as just described, the two portions of the equipment separate, thereby withdrawing the core 17 shown at the bottom of FIG. 3 and carrying with it the preform formed thereon. The turntable 18 is then rotated through 45° in order to bring the molded preform just referred to and the core carrying that preform into registration with an adjoining blow mold. The two parts of the equipment then come together again in order to introduce the preform into a blow mold. Toward the top of FIG. 3 there is illustrated a blow mold into which a core 17 has been inserted, but in the condition illustrated at the top of FIG. 3, the article has already been blown. The blowing has resulted from the opening of the air flow channel 33 into the space between the surfaces at 32 and thence outwardly into the interior of the preform closely adjacent to the injection molded neck portion. This opening of the flow channel for blowing air was effected by the action of the cam 35 operating on the remote end of the core stem 26 when the turntable 18 was moved to bring the core into registry with the blow mold. The introduction of the air in this region of the preform is of advantage for progressively stripping the preform from the core during the blowing operation, and the fact that the blowing air is introduced through an annular orifice around the neck portion aids in improving the uniformity of blow.

In connection with the circulation of the heat transfer medium through the cores, it is first pointed out that the resin material being injected into the preform molds is relatively hot, for instance in the case of polystyrene, at a temperature of the order of 400°–500° F. The consistency of the resin at this temperature is relatively fluid and not appropriate for maintenance of the shape of a molded preform. For this reason, the temperature of the molded preform should be reduced before the cores and the preforms are withdrawn from the injection molds. This reduction in temperature is accomplished by the circulation of a heat transfer medium through the central passages within the cores. Oil is a suitable heat transfer medium for this purpose and in the case of the molding of articles from polystyrene, the temperature of the oil entering the circulation passages in the cores should be of the order of 220°–240° F. When the oil leaves the core passages it will of course be at a higher temperature and will require some cooling before it is returned to the circulation passages. This serves to maintain the body portion of the preform at a consistency which is appropriate for the transfer to the blow mold and also at a consistency appropriate for actual blowing within the blow mold. The cooling passages 56 in the walls of the injection mold also carry away some of the heat introduced into the system by the injection of the hot resin.

When the preforms are actually blown in the blow molds, immediately upon release from the core and upon engagement of the body of the plastic material with the blow mold walls, the plastic gives up heat to the cooled mold walls and thus quickly solidifies within the blow mold cavity. Although the cooling channels 55 are located in the mold mounting structure 52, rather than in the split mold parts 39, the contact of the split mold parts with the mounting structure effectively carries heat away by conduction.

Upon sufficient cooling to rigidify the article being formed, the withdrawal motion of the core is initiated, and because of the interlock between the split ring 40 and the neck of the article being molded, the withdrawal of the core carries the blown article with it. At this time the blow cavity pistons 54 are also actuated so that the split mold parts 39 are maintained in engagement with the split neck ring 40 as the core structure is withdrawn from the blow mold. In addition, during this motion the split mold parts 39 are separating in order to disengage from the contours of the blown article. After sufficient opening of the mold parts 39 to permit withdrawal of the article, the opening motion which was initiated by the blow cavity pistons 54 terminates and there is then a continued withdrawal of the core 17, carrying the blown article with the core, because of the interengagement of the neck portion between the core base 25 and the neck ring 50.

Upon further withdrawal of the core and neck ring, the neck pistons 42 operate to open the neck ring splits, thereby forcing the formed article toward the end of the core and breaking the grip of article on the core base where it was molded. As the neck ring splits travel in the opening direction, they also move outwardly from the core base, thereby disengaging from any threads, ribs or undercut provided on the neck of the article. This withdrawal motion of the core continues until the formed article is clear of the blow mold cavity, and air is then introduced into the article through the normal blowing slot, and since the article has not been loosened on the core base and further since the article is now solidified, this blowing air blows the article off the core and it falls by gravity to an area below the mold where the finished parts are collected.

Upon completion of this portion of the cycle the mechanism for oscillating the turntable 13 is again operated in the opposite direction in order to carry the cores an angular distance of 45° from the blow molds back into registry with the injection molds. The movable platen then advances to cause re-entry of the cores into the molds and the neck ring pistons are operated to close the neck ring and the blow mold pistons are operated to close the blow molds. The neck rings and the molds are all closed when the press is closed.

With regard to the number of cores and molds employed, it is to be understood that more or less than eight of each may be employed. Preferably at least eight are utilized (one-half of the molds being injection molds and the other half being blow molds) because this provides for limiting the angular oscillation of the turntable to 45°. Increase in the total number of molds to twelve will further reduce the angular oscillation to 30°, and still further increase in the total number will still further decrease the angular oscillation, as will be understood. It will also be appreciated that molds and cores may additionally be multiplied to form pairs or groups, which groups are distributed according to the geometry providing the preferred limited angular oscillation.

Although it is preferred to arrange the cores and molds in a manner providing for angular oscillation of the cores through a range less than 180°, it should be understood that certain of the individual structural arrangements and features of the equipment may even be used in a system where the transfer motion extends through any angular range.

Notwithstanding the above possibility, still, an angular oscillation of the turntable not exceeding 90° has been found to be preferable. When the angular oscillation of the turntable amounts to 90°, such allows for an equidistant angular spaced arrangement of two injection molds and two blow molds in alternating fashion. With this magnitude of oscillation angle the conduits for the compressed air, cooling medium and heating fluid can still just be moved back-and-forth between the struts or framing of the equipment. It is, however, advantageous to provide preferably more than two injection molds and two blow molds.

Figure 5:
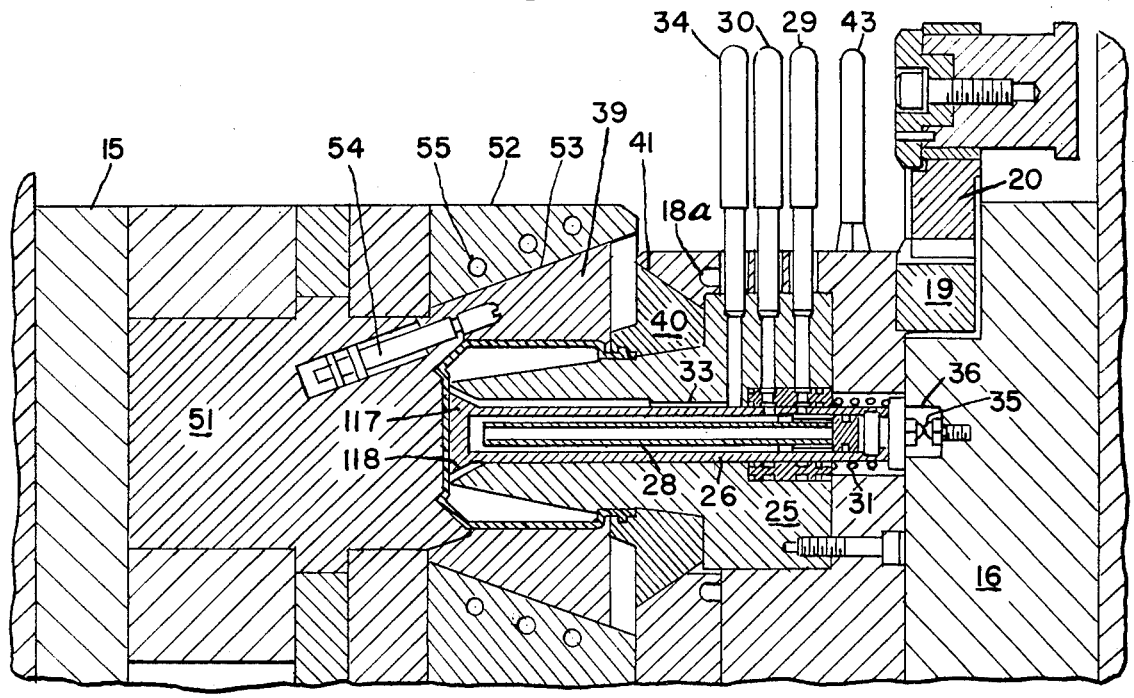
FIGS. 5 and 6 are transverse sectional views of two further embodiments of core arrangements similar to that represented in FIG. 3.

In contrast to the illustrated exemplary embodiment, it can be advantageous not to construct the entire portion of each core 17 filling the preform as a punch element movable against the bottom of the blow mold. If desired, such punch element or punch can be limited, as shown in FIG. 5, to a portion of the end face 117 of the core. This portion when is used to press the preform against the bottom 51 of the blow mold. To this end, it would be possible to place the mouth of the air infeed channel for the blowing air likewise in this punch portion. There would thus be provided a circular ring-shaped infeed flow gap 118 or space which blows the blowing air directly against the bottom of the preform. Actuation of this punch 117, constituting only one part of the core, can occur in the same manner illustrated for the arrangement of FIG. 3.

Figure 6:
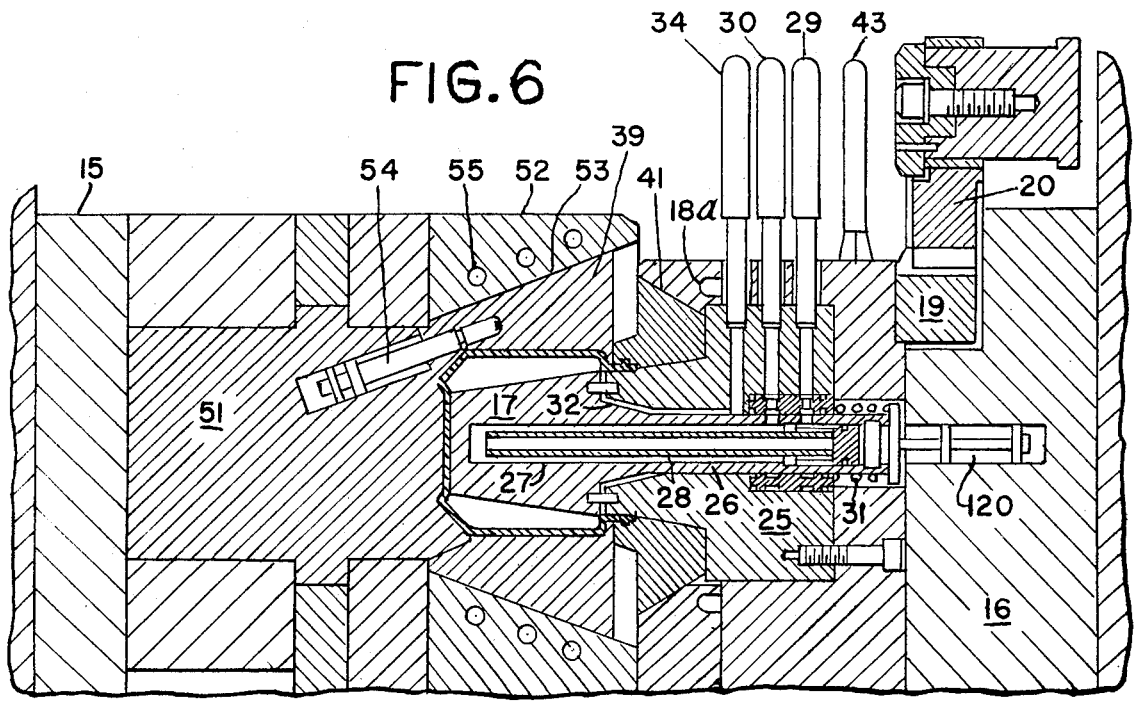

The above-described positive actuation of the punch of the core can be, in many cases, undesirable. Therefore, under certain circumstances, it is advantageous if the punch of the core is not positively automatically extended upon entering the blow mold station. This can be advantageously realized, as shown in FIG. 6, in that the extendible punch 17 of the core can be actuated by means of a suitable hydraulic piston-cylinder drive arrangement 120. Such piston-cylinder drive arrangement 120 could be arranged within the core base 25 directly at the movable punch. In most cases, however, it would be more desirable to provide such piston-cylinder drive arrangement 120 in the second movable support or back plate 16, analogous to the arrangement of the cams 35 illustrated in FIG. 3. Consequently, the extension and retraction of the punch 17 can be more exactly controlled or accommodated. Thus, the punch 17, for instance, would then only first be extended when the preform has been actually completely arranged in the blow mold. On the other hand, the punch 17 can also be retracted before the formed blown article has been removed from the blow mold. As a result, cooling of the molded article is accelerated, since the heated punch is prematurely removed from the molded article which bears against the cooler wall of the blow mold.

The mold tool is preferably constructed in such a manner that the portions forming the molds and the cores are designed as exchangeable mold inserts for the ready changeover from one type to another of the molded articles which are to be fabricated. By simply exchanging the mold sets, it is possible to convert the mold tool in the quickest possible manner for the fabrication of a new or different type molded article, without such tool having to be removed from the injection molding machine.

We claim:

1. Injection blow molding equipment in the form of an adapter or tool for use with an injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, said oscillation being between two molding stations angularly offset from each other by an angle of 90° or less, mold cores mounted on and projecting from the movable plate toward the stationary plate, molds mounted on the stationary plate in positions to receive the cores when the movable plate advances toward the stationary plate, said molds including for each core a preform injection mold positioned to register with the core when the turntable is in one of said molding stations and also including a blow mold positioned to register with the core when the turntable is in the other of said molding stations, and means for delivering softened plastic from the injection device into the injection molds through the bottom thereof.

2. Equipment as defined in claim 1 and further including blowing means providing for expansion of molded preforms in the blow molds and including for each core an associated blowing passage arranged to deliver blowing air into the preform molded on the core in a region remote from the bottom of the preform.

3. Injection blow molding equipment in the form of an adapter or tool for use with an injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate toward and away from the stationary plate, a turntable mounted on the movable plate for angular oscillation about an axis normal to the plates, an annular series of mold cores mounted on and projecting from the movable plate toward the stationary plate, an annular series of molds mounted on the stationary plate in positions to receive the cores when the movable plate advances toward the stationary plate, alternate molds in said series comprising preform injection molds and blow molds, and means for angularly oscillating the turntable when the movable plate is moved away from the stationary plate to provide for insertion of a given core alternately into said alternate injection and blow molds.

4. Injection blow molding equipment in the form of an adapter or tool for use with an injection molding machine having a stationary platen with an injection device for softened plastic associated therewith, and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of mold cores mounted on and projecting from the movable plate toward the stationary plate, an annular series of molds mounted on the stationary plate in positions to receive the cores when the movable plate advances toward the stationary plate, some of said molds in said series comprising injection molds for molding open-top closed-bottom preforms and annularly adjacent molds in said series comprising blow molds, means for angularly oscillating the turntable to provide for insertion of a given core alternately into said annularly adjacent injection and blow molds, means for delivering softened plastic from the injection device into the injection molds through the bottom thereof, and means for introducing blowing air at a neck region of each preform when it is inserted into a blow mold.

5. Injection blow molding equipment in the form of an adapter or tool for use with an injection molding machine having a stationary platen with a centrally located injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of eight mold cores mounted on and projecting from the movable plate toward the stationary plate, an annular series of four preform molds mounted on the stationary plate in positions to receive four of the cores when the movable plate advances toward the stationary plate, hot runners in the form of a cross for delivering softened plastic from a centrally located injection device to the bottom of the four preform molds, an annular series of four blow molds mounted on the stationary plate in positions between the preform molds, and means for angularly oscillating the turntable to provide for insertion of a given core alternately into adjacent injection and blow molds.

6. Equipment according to claim 5 and further including means providing for thermal insulation of the molds from the hot runners.

7. Injection blow molding equipment in the form of an adapter or tool for use with an injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of mold cores mounted on and projecting from the movable plate toward the stationary plate, an annular series of molds mounted on the stationary plate in positions to receive the cores when the movable plate advances toward the stationary plate, some of said molds in said series comprising preform injection molds and annularly adjacent molds in said series comprising blow molds, means for angularly oscillating the turntable to provide for insertion of a given core alternately into said annularly adjacent injection and blow molds, means for cooling the blow molds, hot runners for delivering softened plastic from the injection device to the injection molds, and mounting means for the hot runners providing for thermal insulation of the runners from the stationary plate.

8. Injection blow molding equipment for making open neck hollow articles, comprising an annular series of cores, an annular series of molds some of which are preform injection molds and some of which are blow molds, mechanism mounting the cores and molds and providing for relative movement of the cores and molds toward and away from each other to effect axial insertion of the cores into the molds and withdrawal of the cores from the molds, mechanism for effecting relative oscillation of the series of molds and cores when they are separated to provide for alternate insertion of each core into annulary adjacent injection and blow molds, heat transfer means for controlling the temperature of the cores, means for cooling at least the blow molds, neck rings mounted for movement with the cores, each neck ring surrounding a core and cooperating therewith to form a cavity for injection molding of an open neck of an article, and means for injecting heat softened plastic material into the injection molds including the neck cavity, the neck ring being dimensioned and mounted to abut a cooled mold when the core is inserted therein and thereby provide for heat transfer from the neck ring to the cooled mold.

9. Equipment as defined in claim 8 in which the neck ring is split to provide for opening and closing movement of the ring, means associated with each neck ring for opening the ring after blowing of an article in a blow mold, and means for closing the neck ring of a core being inserted into the injection mold.

10. Injection blow molding equipment for making open neck hollow articles, comprising an annular series of cores, an annular array of molds some of which are preform injection molds and some of which are blow molds, mechanism mounting the cores and molds and providing for relative movement of the cores and molds toward and away from each other to effect insertion of the cores axially into the molds and withdrawal of the cores from the molds, mechanism for effecting relative oscillation of the series of molds and cores when they are separated to provide for insertion of each core alternately into two annularly adjacent molds in said array one of which is an injection mold and the other of which is a blow mold, neck rings mounted for movement with the cores, each neck ring surrounding a core and cooperating therewith to form a cavity for injection molding of an open neck of an article, and means for injecting heat softened plastic material into the injection molds including the neck cavity, the neck ring being dimensioned and mounted to abut a blow mold when the core is inserted therein and thereby cooperate with the blow mold to provide a neck forming continuation of the mold cavity.

11. Equipment as defined in claim 10 in which the blow mold and the neck ring are split and have abutting parts, and means for maintaining said abutting parts in abutting relation during the initial portion of the withdrawal motion of the core, and means for opening the neck ring during the withdrawal motion of the core.

12. Equipment as defined in claim 11 and further including guide means defining a path of opening motion of the neck ring splits inclined away from the path of the withdrawal motion of the core to provide for release of the neck of the container from the portion of the core on which it was molded.

13. Injection blow molding equipment in the form of an adapter or tool for use with an injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of mold cores mounted on the movable plate and directed towards the stationary plate, an annular series of molds mounted on the stationary plate in positions to receive the cores when the movable plate advances toward the stationary plate, at least two of said molds in said series comprising preform injection molds and at least two of said molds in said series comprising blow molds, said preform injection molds and said blow molds being alternately arranged at a substantially uniform mutual angular spacing from one another, means for angularly oscillating the turntable through a distance corresponding to the mutual spacing between two adjacent molds to provide for insertion of a given core alternately into injection and blow molds, and means for delivering softened plastic from the injection device into the injection molds.

14. Equipment as defined in claim 13, wherein said means for delivering softened plastic into the injection molds opens into the bottom of each such injection mold.

15. Injection blow molding equipment in the form of an adapter or tool for use with an injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of mold cores mounted on the movable plate and directed towards the stationary plate, an annular series of molds mounted on the stationary plate in positions to receive the cores when the movable plate advances towards the stationary plate, at least two of said molds in said series comprising preform injection molds and at least two of said molds in said series comprising blow molds, said preform injection molds and said blow molds being alternately arranged at a substantially uniform mutual angular spacing from one another, means for angularly oscillating the turntable through a distance corresponding to the mutual spacing between two adjacent molds to provide for insertion of a given core alternately into injection and blow molds, and means for delivering softened plastic from the injection device into the injecting molds, each mold core being equipped with an extendible punch which when engaging with one of said blow molds is adapted to be pressed against the bottom of such blow molds, each mold core further including channel means, said punch then simultaneously freeing said channel means through which blowing air can be blown in, cam means provided at said movable plate mounting said turntable, said cam means being disposed at locations of said movable plate situated opposite said blow molds, said cam means serving to press said extendible punch of each core against the bottom of the associate blow mold, and said annular series of molds being arranged in a circle, said movable plate being provided with at least substantially arcuate-shaped groove means, the central line of said groove means substantially coinciding with the pitch circle of said circular core arrangement and within which said cam means are arranged, said extendible punch of each core including shoulder means engaging with the associate groove means.

16. Injection blow molding equipment in the form of an adapter or tool for use with and injection molding machine having a stationary platen with an injection device for softened plastic associated therewith and a platen movable toward and away from the stationary platen, the tool comprising a pair of mounting plates respectively arranged for attachment to the platens of such an injection machine and thereby provide for stationary positioning of one plate and for movement of the other plate with respect to the stationary plate, a turntable mounted on the movable plate for angular oscillation about an axis normal to the plates, an annular series of mold cores mounted on the movable plate and directed towards the stationary plate, an annular series of molds mounted on the stationary plate in positions to receive the cores when the movable plate advances toward the stationary plate, at least two of said molds in said series comprising preform injection molds and at least two of said molds in said series comprising blow molds, said preform injection molds and said blow molds being alternately arranged at a substantially uniform mutual angular spacing from one another, means for angularly oscillating the turntable through a distance corresponding to the mutual spacing between two adjacent molds to provide for insertion of a given core alternately into injection and blow molds, and means for delivering softened plastic from the injection device into the injection molds, each mold core being equipped with an extendible punch when engaging with one of said blow molds is adapted to be pressed against the bottom of such blow molds, each mold core further including channel means, said punch then simultaneously freeing said channel means through which blowing air can be blown in, a hydraulic piston-cylinder arrangement provided for each extendible punch of each core, said hydraulic piston-cylinder arrangement being adapted to be actuated by a control mechanism when said extendible punch of the associated mold core is located in a blow mold, and said piston-cylinder arrangement is located at said movable plate mounting said turntable and at locations of said movable plate situated opposite said blow molds.

17. Equipment as defined in claim 13 wherein each of said blow molds incorporates at least bipartite laterally arranged split mold parts capable of being displaced, and piston-cylinder devices for displacing each said laterally arranged split mold part.

18. Equipment as defined in claim 17, further including a mold mounting structure provided on said stationary mounting plate, said split mold parts of each blow mold in their closed position bearing against said mold mounting structure, said mold mounting structure being equipped with channel means for conveying a cooling agent.

19. Equipment as defined in claim 13, wherein each of said injection molds is provided with channel means for conveying a cooling agent.

20. Equipment as defined in claim 13, wherein each mold core is provided with channel means for conveying fluid heat transfer medium.

21. Equipment as defined in claim 13, wherein each mold core is provided with a core base fixedly mounted on said turntable, a split neck ring bearing against such core base, the neck ring parts bearing against a guide surface on the turntable which surface diverges in a direction towards said molds, and hydraulic piston-cylinder means for outwardly displacing said neck ring parts along said guide surface.

22. Equipment as defined in claim 13, wherein the components forming said molds and said mold cores are constructed in the form of exchangeable mold inserts for the purpose of changing-over to the manufacture of different molded articles.

* * * * *